US009146375B2

(12) United States Patent
Terry et al.

(10) Patent No.: US 9,146,375 B2
(45) Date of Patent: Sep. 29, 2015

(54) LOW PROFILE BEND RADIUS LIMITER

(71) Applicant: ADC Telecommunications, Inc., Berwyn, PA (US)

(72) Inventors: Shannon T. Terry, Plymouth, MN (US); Erik Estrada Gonzalez, Chihuahua (MX); Genaro Neri, CD Juarez (MX)

(73) Assignee: ADC Telecommunications, Inc., Berwyn, PA (US)

( * ) Notice: Subject to any disclaimer, the term of this patent is extended or adjusted under 35 U.S.C. 154(b) by 0 days.

(21) Appl. No.: 14/340,041

(22) Filed: Jul. 24, 2014

(65) Prior Publication Data
US 2015/0030300 A1    Jan. 29, 2015

Related U.S. Application Data

(60) Provisional application No. 61/858,367, filed on Jul. 25, 2013.

(51) Int. Cl.
*G02B 6/44* (2006.01)
*G02B 6/46* (2006.01)

(52) U.S. Cl.
CPC ............... *G02B 6/4478* (2013.01); *G02B 6/46* (2013.01); *G02B 6/4452* (2013.01)

(58) Field of Classification Search
CPC .................................................... G02B 6/4478
See application file for complete search history.

(56) References Cited

U.S. PATENT DOCUMENTS

| | | | |
|---|---|---|---|
| 6,539,161 B2 | 3/2003 | Holman et al. | |
| 6,546,179 B2 * | 4/2003 | Petri | 385/134 |
| 6,665,484 B2 | 12/2003 | Douglas et al. | |
| 6,768,858 B2 | 7/2004 | Tinucci et al. | |
| 6,771,871 B2 | 8/2004 | Krampotich et al. | |
| 6,892,020 B2 | 5/2005 | Douglas et al. | |
| 6,947,654 B2 | 9/2005 | Krampotich et al. | |
| 6,980,726 B2 * | 12/2005 | Daoud et al. | 385/136 |
| 7,097,473 B2 | 8/2006 | Krampotich et al. | |
| 7,346,252 B2 | 3/2008 | Krampotich et al. | |
| 8,424,814 B2 * | 4/2013 | Davis et al. | 248/49 |

* cited by examiner

*Primary Examiner* — Jerry Rahll
(74) *Attorney, Agent, or Firm* — Merchant & Gould P.C.

(57) ABSTRACT

A bend radius limiter adapted for installation on a fiber guide is disclosed. In one aspect, the bend radius limiter has a main body with a generally rounded outer surface and an interior surface that defines an interior volume. The main body is also configured with a first slot opening in the generally rounded outer surface that may optionally function as a first or second connecting feature. The bend radius limiter can also include a first connecting feature configured to retain the bend radius limiter onto the fiber guide. In one embodiment, the first connecting feature is located within the interior volume and is radially aligned with the first slot opening.

21 Claims, 10 Drawing Sheets

LOW PROFILE BEND RADIUS LIMITER

CROSS REFERENCE TO RELATED APPLICATIONS

This applications claims the benefit of U.S. Provisional Application No. 61/858,367, filed Jul. 25, 2013, and titled "Low Profile Bend Radius Limiter," the disclosure of which is hereby incorporated herein by reference.

TECHNICAL FIELD

The present invention relates to an optical fiber distribution system, including components for managing and routing optical fiber cables.

BACKGROUND

Optical fiber distribution systems include fiber terminations and other equipment which is typically rack mounted. Various concerns exist for the optical fiber distribution systems, including density, ease of use, and cable management. There is a continuing need for improvements in the optical fiber distribution area, particular in high density applications with increased fiber counts and reduced space for routing of the fibers.

SUMMARY

A bend radius limiter adapted for installation on a fiber guide is disclosed. In one aspect, the bend radius limiter has a main body with a generally rounded outer surface, such as a generally cylindrical outer surface, and an interior surface that defines an interior volume. The main body extends a first length between a first end and a second end. The main body is also configured with a first slot opening in the generally rounded or cylindrical outer surface wherein the first slot opening extends along the first length. In one aspect, the bend radius limiter includes a first connecting feature configured to retain the bend radius limiter onto the fiber guide. In one embodiment, the first connecting feature is located within the interior volume and is radially aligned with the first slot opening. In order to retain fibers on the bend radius limiter, one or more cable retention members can be provided at the first end and second ends of the main body.

The bend radius limiter can be removably installed on a fiber guide having at least one extension member and an adjacent side opening. When installed, the fiber guide extension member passes through the first slot opening and engages with the first connecting feature. In one embodiment, the first connecting feature includes a pair of engagement members that extend radially inward from the interior surface and towards the first slot opening and along the sides of the fiber guide extension member. To further secure the connection between the fiber guide extension member and the engagement members, the engagement members may be provided with one or more inwardly extending protrusions or ribs that can also provide for an indexing feature for enabling an installer to determine when the bend radius limiter has been fully installed on a fiber guide. Additionally, the first slot can be configured as a first or second connecting feature to further retain the bend radius limiter onto the fiber guide.

DESCRIPTION OF THE DRAWINGS

Non-limiting and non-exhaustive embodiments are described with reference to the following figures, which are not necessarily drawn to scale, wherein like reference numerals refer to like parts throughout the various views unless otherwise specified.

DETAILED DESCRIPTION

Figure 1:
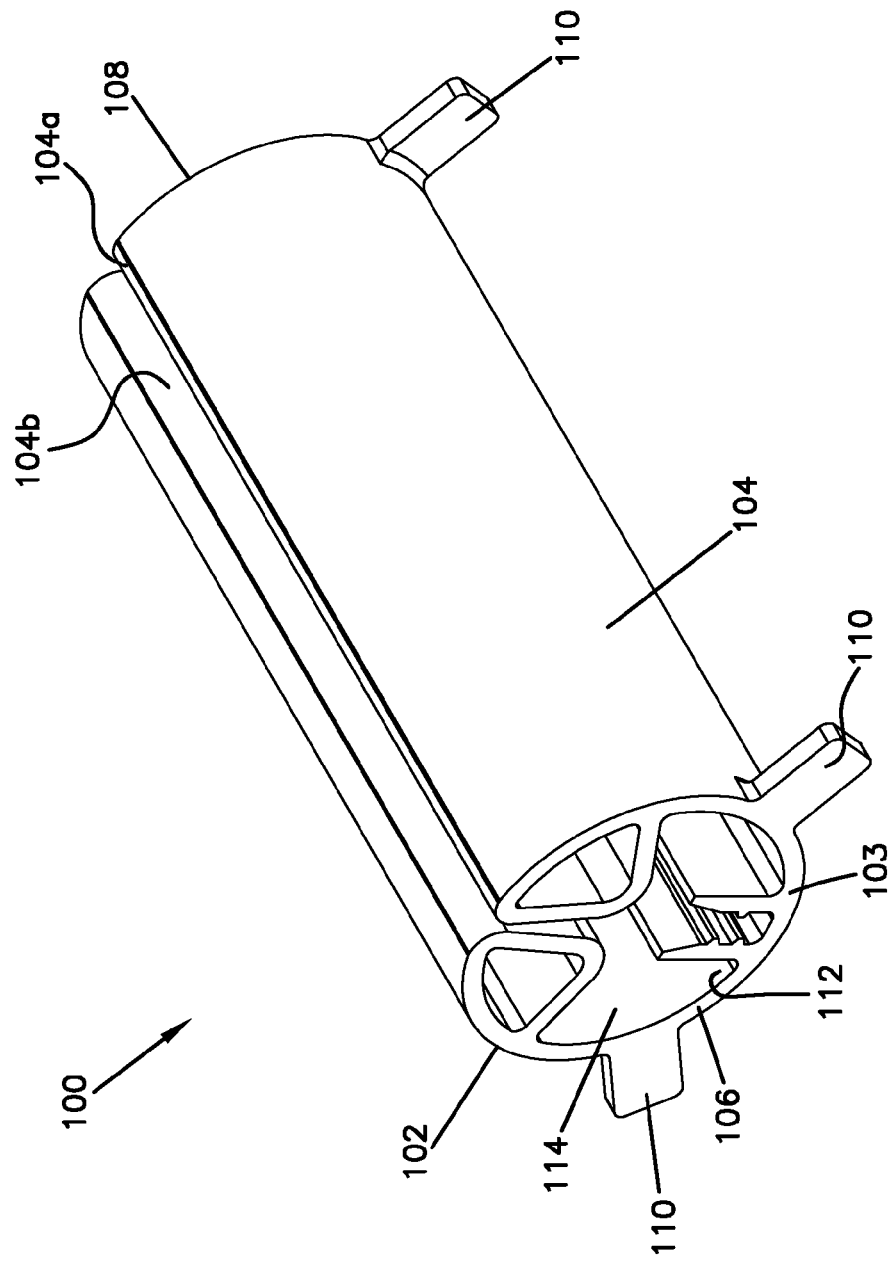
FIG. 1 is a perspective view of a bend radius limiter having features that are examples of aspects in accordance with the principles of the present disclosure.
Figure 2:
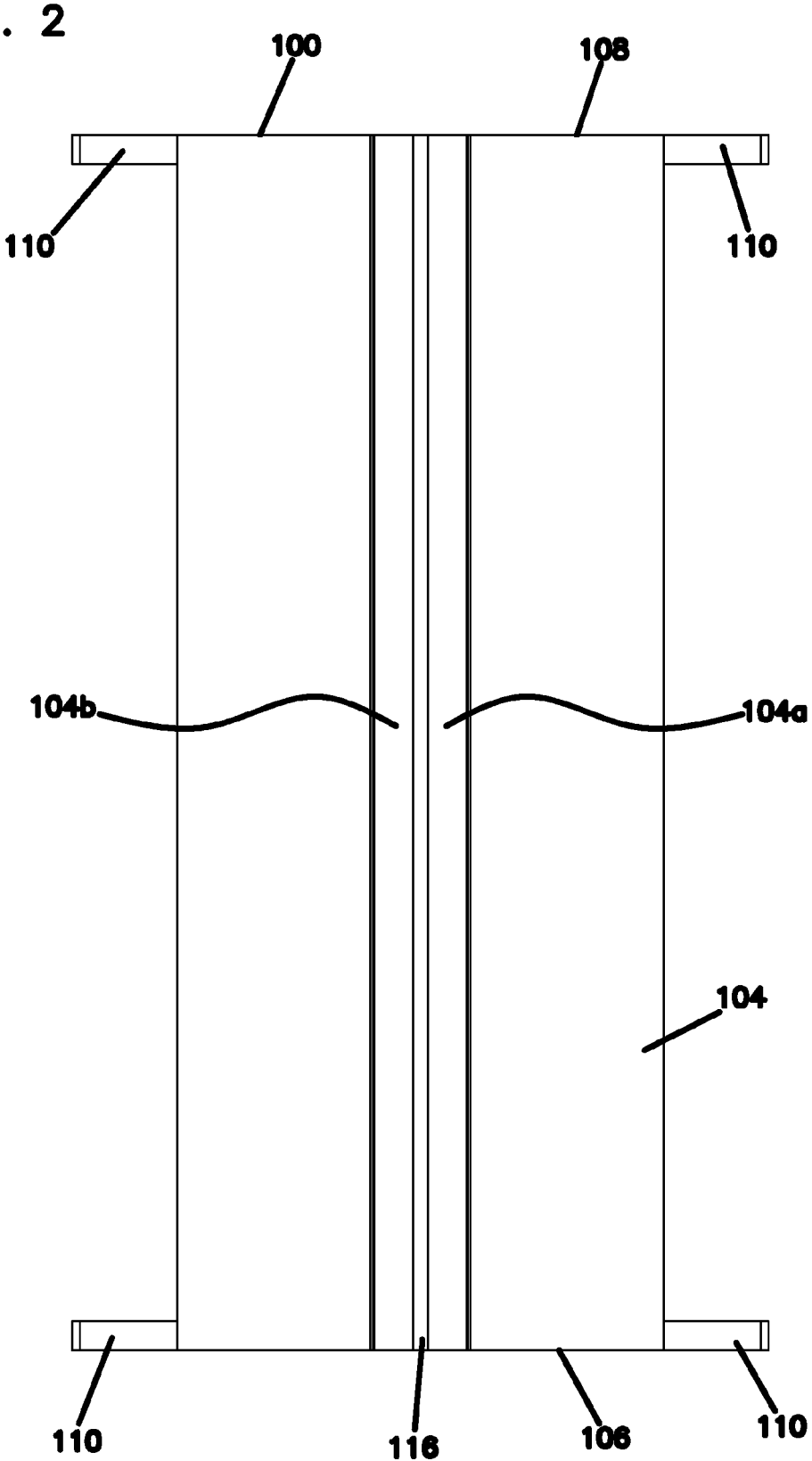
FIG. 2 is a bottom side view of the bend radius limiter shown in FIG. 1.
Figure 3:
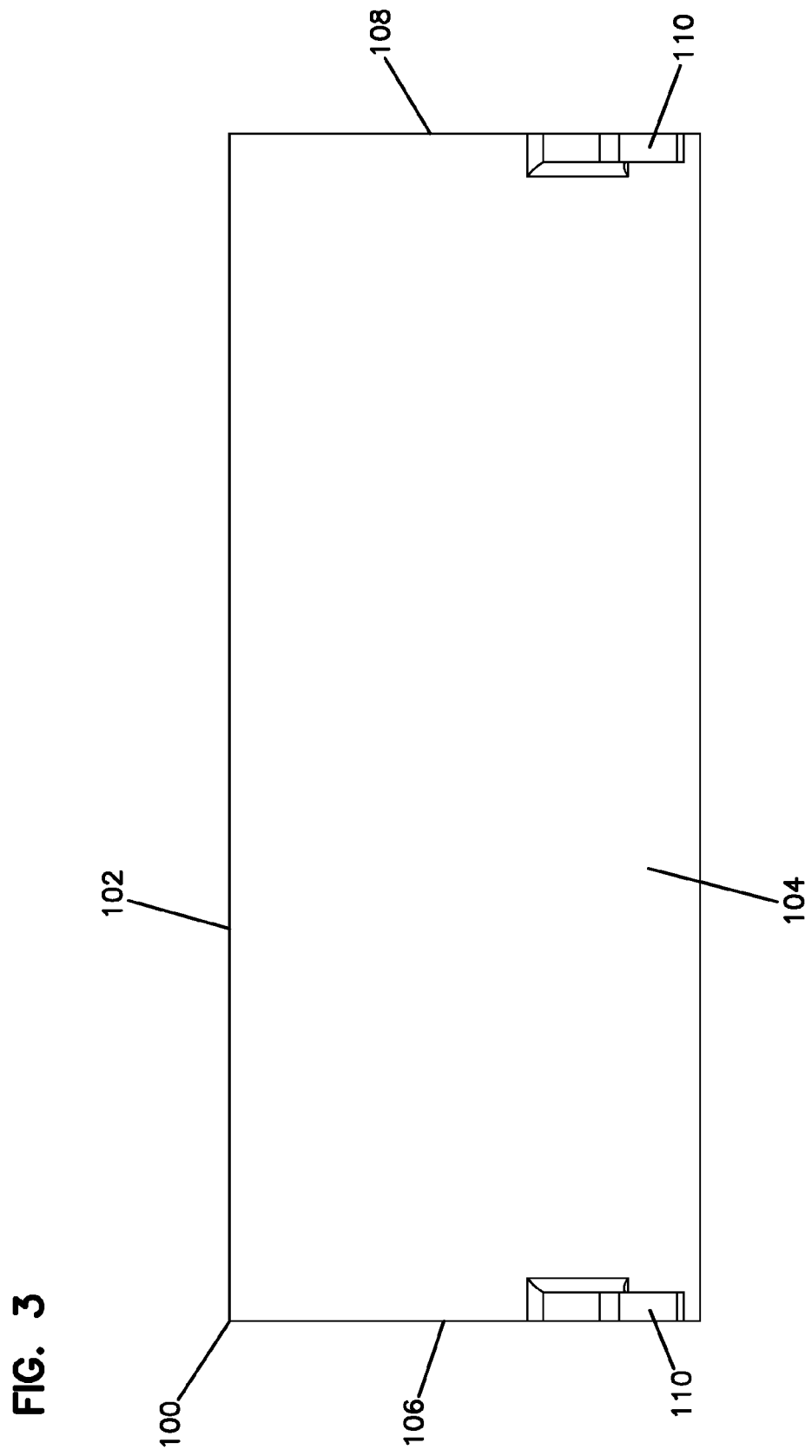
FIG. 3 is top side view of the bend radius limiter shown in FIG. 1

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

With reference to FIGS. 1-6 a bend radius limiter 100 is shown. In one aspect, the bend radius limiter 100 is removably installable on a fiber guide 10 to provide support and protection for cables 200, 202 extending from equipment through the fiber guide 10. As most easily seen at FIGS. 10 and 11, bend radius limiters 100 are shown as being in an installed position on fiber guides 10 that form a portion of a fiber distribution rack or cabinet assembly 11. In one embodiment, the bend radius limiter 100 includes a first connecting feature 120 and a longitudinal slot opening 116 (discussed later) that acts as a second connection feature for retaining the bend radius limiter 100 onto the fiber guide.

Examples of various configurations of fiber guides 10 with the disclosed bend radius limiter 100 are presented at FIGS. 7-10 where it can be seen that the fiber guides 10 are provided with a plurality of extension members 12 and adjacent openings 14. Each of the extension members 12 is shown as having opposite first and second sides 12c, 12d extending between opposite top and bottom edges 12a, 12b. Each of the extension members 12 may also be provided with an end guard 16 that partially extends into the adjacent openings 14 and aids in retaining the bend radius limiter 100 on the extension member 12 in an axial direction. In use, cables 200, 202 extend from equipment and through the fiber guide openings 14 such that they are supported by the fiber guide 10. As the top and bottom edges 12a, 12b of the fiber guide extension members 12 can have relatively sharp edges that can damage cables, the addition of a bend radius limiter 100 provides an improved support surface.

In one aspect, the removable bend radius limiter 100 has a main body 102 formed from a sidewall 103 that defines a generally rounded outer surface 104 and an interior surface 112, further defining an interior volume 114. As used herein, the term "generally rounded" is meant to include any surface that has a curvature when viewed from the end or at a cross-section. By way of non-limiting examples, generally rounded surfaces can include circular, arc-shaped, oblong, and elliptical shapes. Accordingly, the generally rounded outer surface 100 may be generally cylindrically shaped and/or tubular shaped, depending on the nature of the rounded surface. In the exemplary embodiment shown, generally rounded outer surface 104 is a generally cylindrical outer surface. As shown, the main body 102 also has a first end 106 and a second end 108 between which the generally rounded outer surface 104 extends. In one embodiment, the generally rounded outer surface 104 has an overall diameter of about 1 inch and an axial length of about 2.5 inches. However, other diameters and lengths are possible without departing from the concepts herein.

To aid in retaining cables on the generally rounded outer surface 104, one or more cable retention members 110 located at the first and second ends 106, 108 may be provided. As shown, the cable retention members 110 extend in a radial direction away from the generally rounded outer surface 104. In one embodiment, the cable retention members 110 extend about 0.3 inches away from the generally rounded outer surface 104. In one embodiment, the cable retention members 110 are integrally formed with the main body 102 and are configured to be generally flexible. In one embodiment, two cable retention members 110 are provided in a radially spaced manner at each of the first and second ends 106, 108.

As shown, the main body 102 is provided with a longitudinal slot opening 116 configured for receiving the extension member 12 of the fiber guide 10. In one embodiment, the longitudinal slot opening 116 extends the length of the main body 102 and is defined at least partially by sidewall portions 103a, 103b that define rounded outer surface portions 104a, 104b. Rounded outer surface portions 104a, 104b are generally provided with a curve that has a radius that is less than that of the generally rounded outer surface 104. This allows for a relatively large opening into slot opening 116 to be formed such that the bend radius limiter 100 does not have to be completely aligned with the extension member 12 during installation, and can instead be rotated into position as the extension member 12 is initially inserted into the slot opening 116. This feature is especially beneficial in configurations where the distance across the adjacent opening 14 to the next extension member 12 is close to or less than the diameter of the bend radius limiter main body 102. It is noted that the flexibility of the cable retention members 110 also aids in installing in limited spaces as the retention member 110 can be bent to provide temporary clearance around other portions of the fiber guide 10.

As shown, the sidewall portions 103a, 103b are integral to the sidewall 103 and are configured such that the outer surface portions 104a, 104b are spaced apart by a distance 116x. In one embodiment, the sidewall 103 and portions 103a, 103b are formed from a resilient material, such as plastic, such that the distance 116x can be expanded with an applied force on the outer surface portions 104a, 104b. For example, the portions 104a, 104b can be expanded away from each other via the insertion force that the top or bottom edge 12a, 12b of the extension member 12 would exert on the bend radius limiter 100 during installation in the case where the extension member 12 has a greater thickness than distance 116x. In one embodiment, distance 116x is about 0.03 inches in a relaxed state and the extension member 12 has a thickness of about 0.09 inches. Where the bend radius limiter main body 102 is made from a resilient material, a clamping force results when in an expanded state against the sides 12c, 12d of the extension member 12, thereby providing a second connecting feature that retains the bend radius limiter 100 on the extension member 12.

Figure 4:
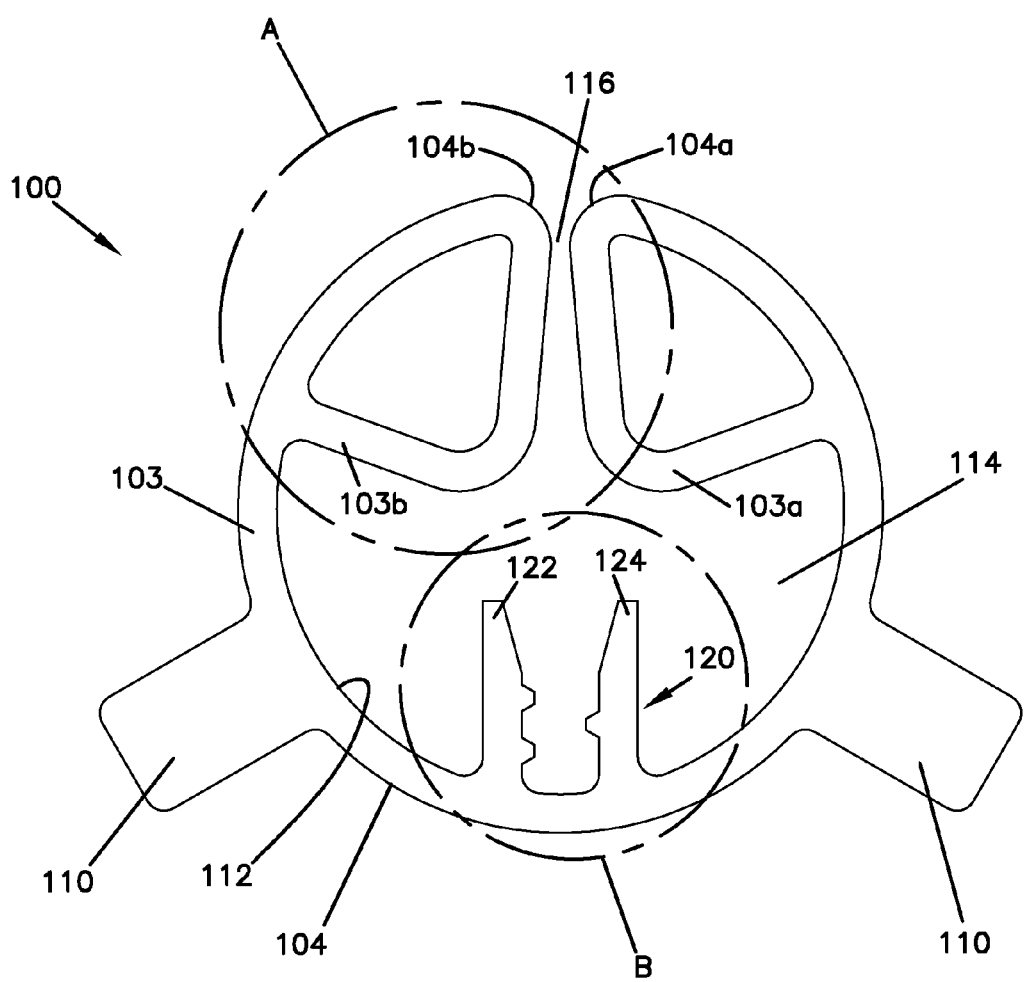
FIG. 4 is an end view of the bend radius limiter shown in FIG. 1.
Figure 5:
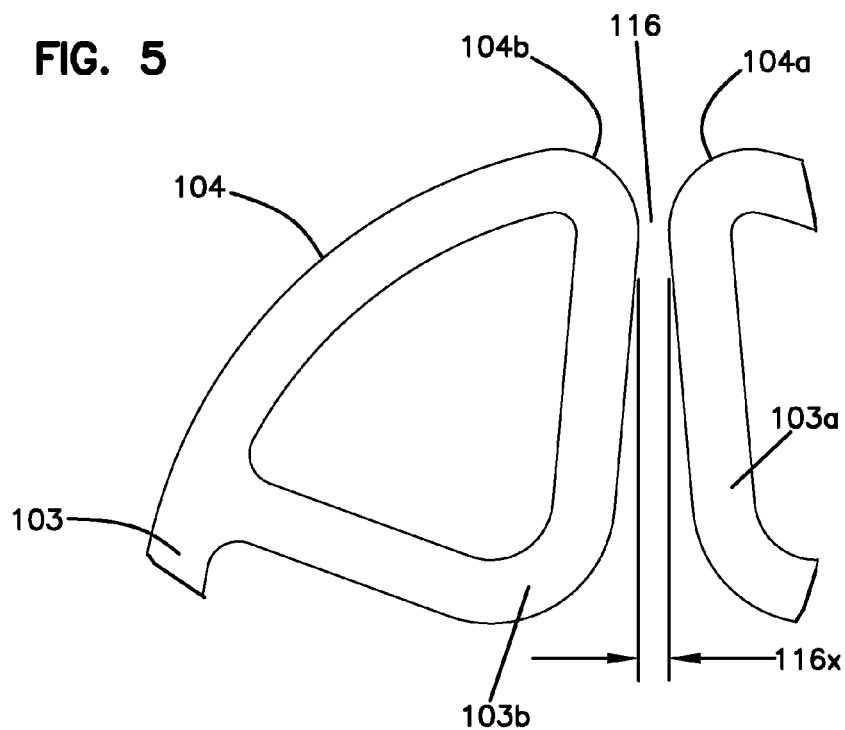
FIG. 5 is an end view of a portion of the bend radius limiter shown in FIG. 4, as denoted by detail A in FIG. 4.
Figure 6:
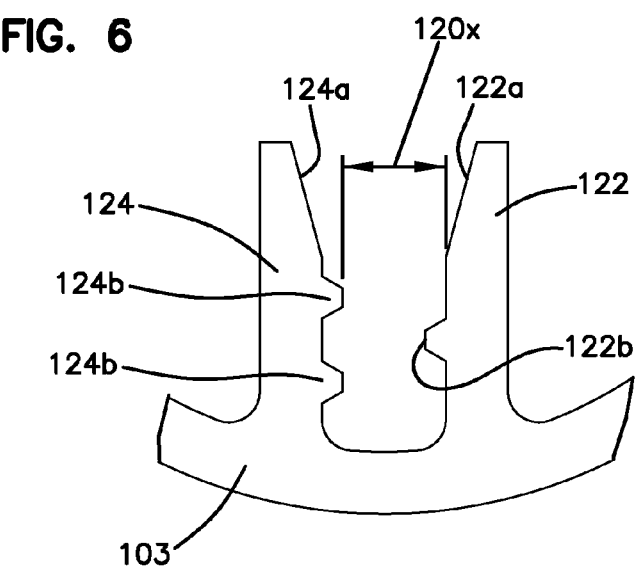
FIG. 6 is an end view of a portion of the bend radius limiter shown in FIG. 4, as denoted by detail B in FIG. 4.

As most easily seen at FIGS. 4 and 6, the bend radius limiter 100 is also provided with a first connecting feature 120. As shown, the first connecting feature 120 is located within the interior volume 114 of the main body 102 and is radially aligned with the first slot opening 116 such that an extension member 12 can extend through the slot opening 116 and into the first connecting feature 120. In one aspect, the first connecting feature 120 is provided with a first engagement member 122 and a second engagement member 124 that extend radially inward from the interior surface 112 and towards the first slot opening 116. The engagement members 122, 124 can be respectively provided with sloped surfaces 122a, 124a to allow for easier insertion and guidance of the extension member 12 between the engagement members 122, 124.

The engagement members 122, 124 can be provided with one or more inwardly extending protrusions or ribs 122b, 124b configured for engaging with the side surfaces 12c, 12d of the extension member 12. In the exemplary embodiment shown, the engagement members 122, 124 and the inwardly extending protrusions ribs 122b, 124b extend along the length of the main body 102. However, it is to be understood that the engagement members 122, 124 could be provided in an intermittent or spaced pattern and that the inwardly extending protrusions or ribs 122b, 124b could be provided as discretely spaced protrusions along the engagement members 122, 124.

As configured, the inwardly extending protrusions or ribs 122b, 124b are spaced apart at a distance 120x that is less than the thickness of the extension member 12. In one embodiment, the distance 120x is about 0.08 inches while the thickness of the extension member 12 is about 0.09 inches. Where the engagement members 122, 124 and/or the inwardly extending protrusions or ribs 122b, 124b are configured to be resilient, the resulting interference fit between the protrusions or ribs 122b, 124b and the extension member 12 acts to secure the bend radius limiter 100 to the extension member 12.

As shown, the first engagement member 122 has a single inwardly extending protrusion or rib 122b while the second engagement member 124 has two inwardly extending protrusions or ribs 124b that are offset with respect to the protrusion or rib 122b in the radial direction. This configuration of spaced and offset protrusions or ribs 122b, 124b provides for an indexing feature that enables an installer to determine when the bend radius limiter 100 has been fully installed on the fiber guide 10, as the installer can feel the slight differences in resistance as the edge 12a or 12b of the extension member 12 passes against each individual protrusion or rib 122b, 124b during installation.

Figure 7:
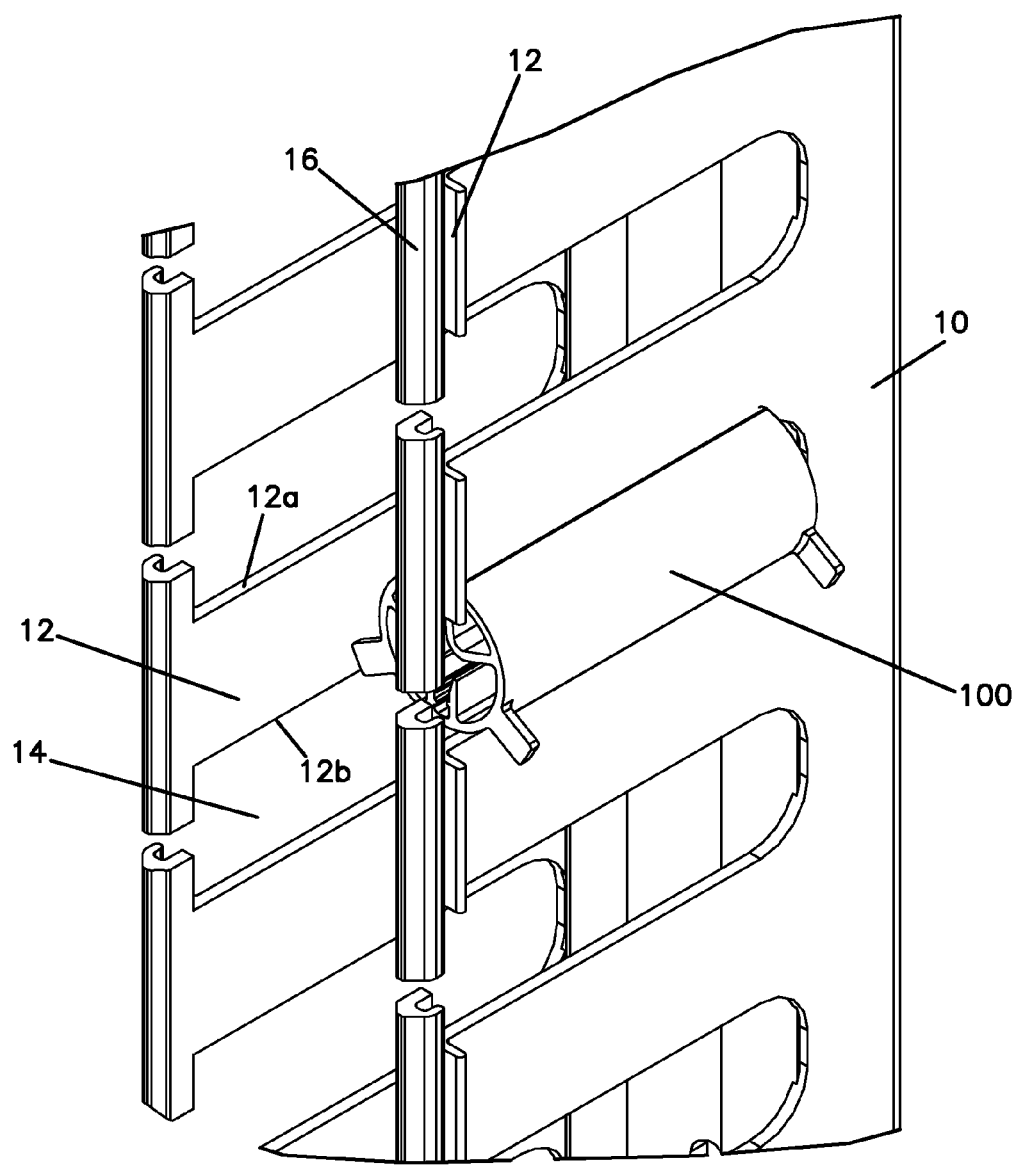
FIG. 7 is a perspective view of the bend radius limiter shown in FIG. 1 during installation in a first orientation on a fiber guide.
Figure 8:
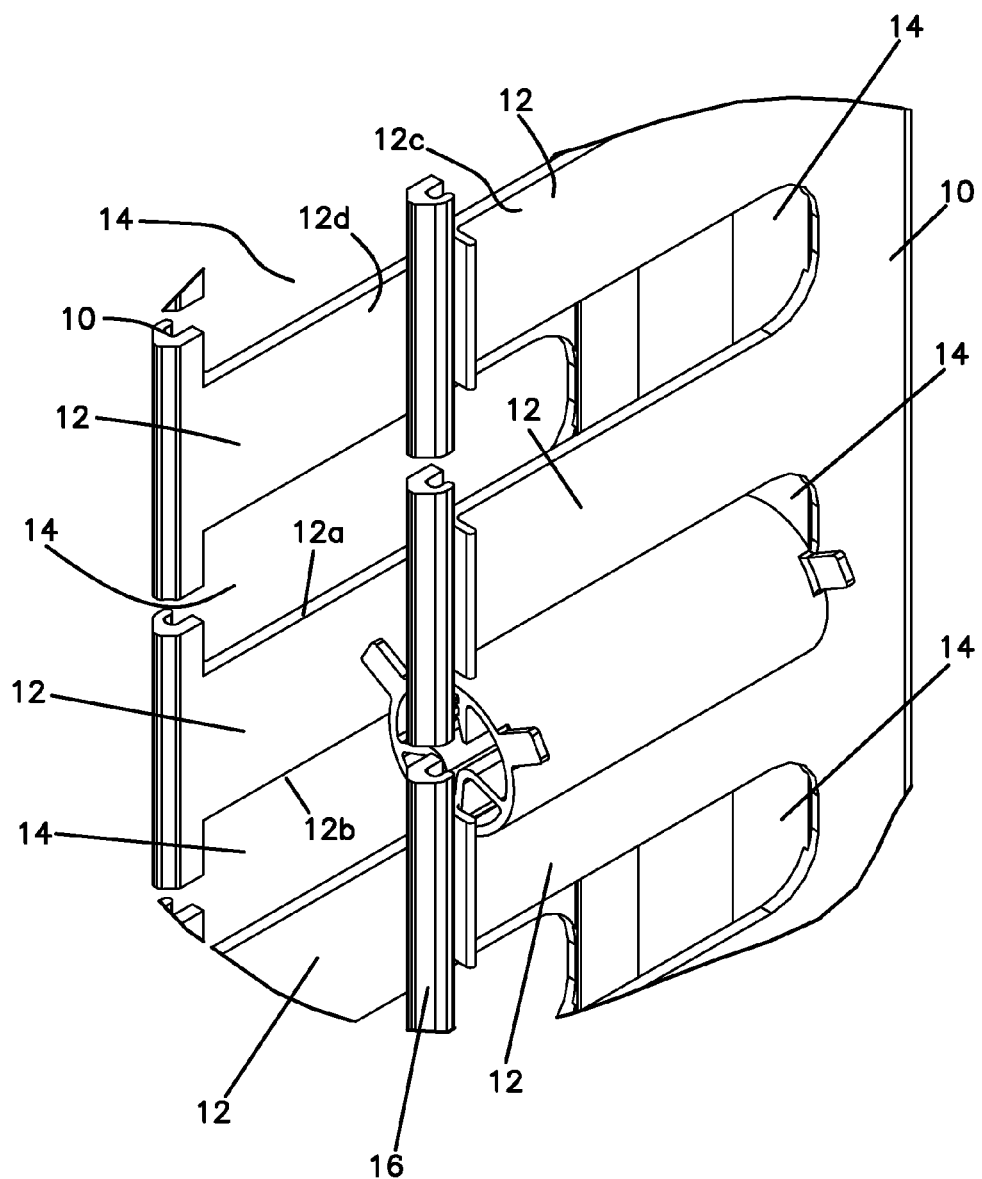
FIG. 8 is a perspective view of the bend radius limiter shown in FIG. 1 during installation in a second orientation on a fiber guide.
Figure 9:
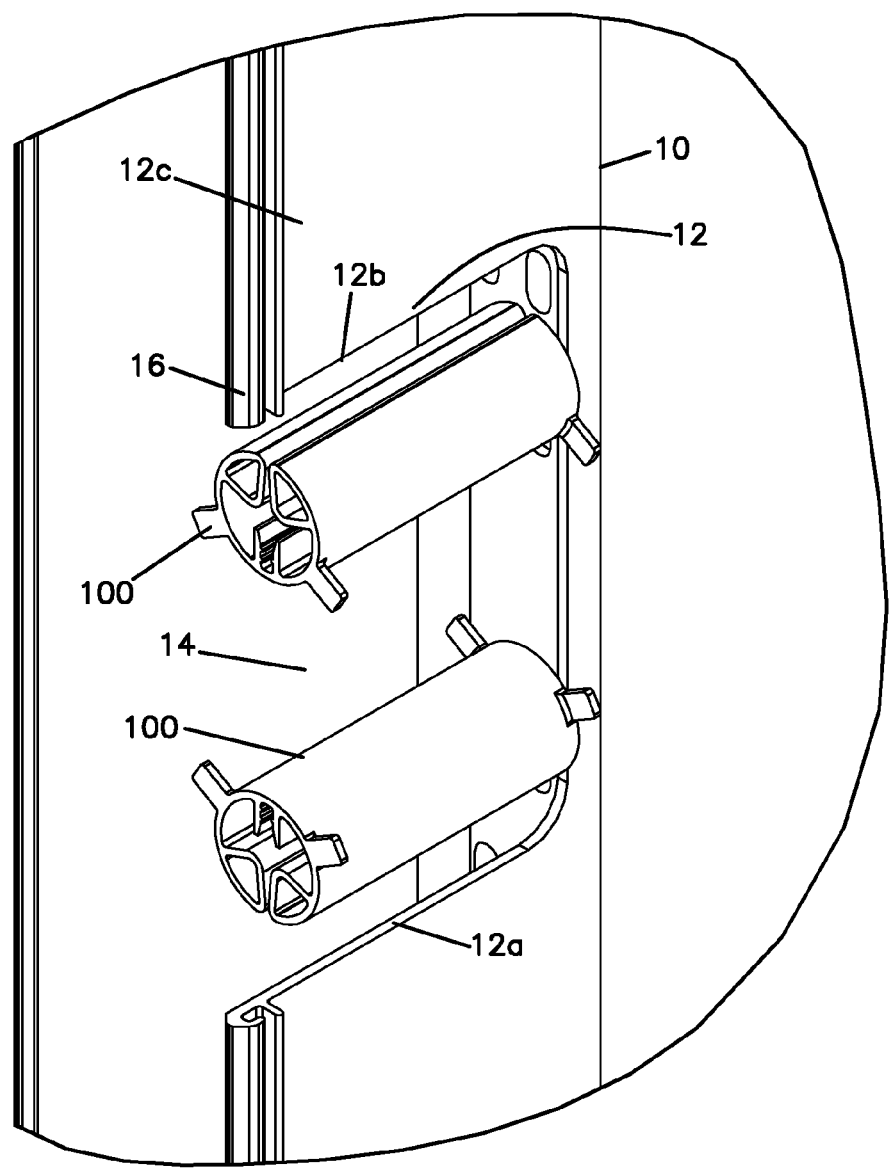
FIG. 9 is a perspective view of two bend radius limiters shown in FIG. 1 during installation in a first and second orientation on a fiber guide.
Figure 10:
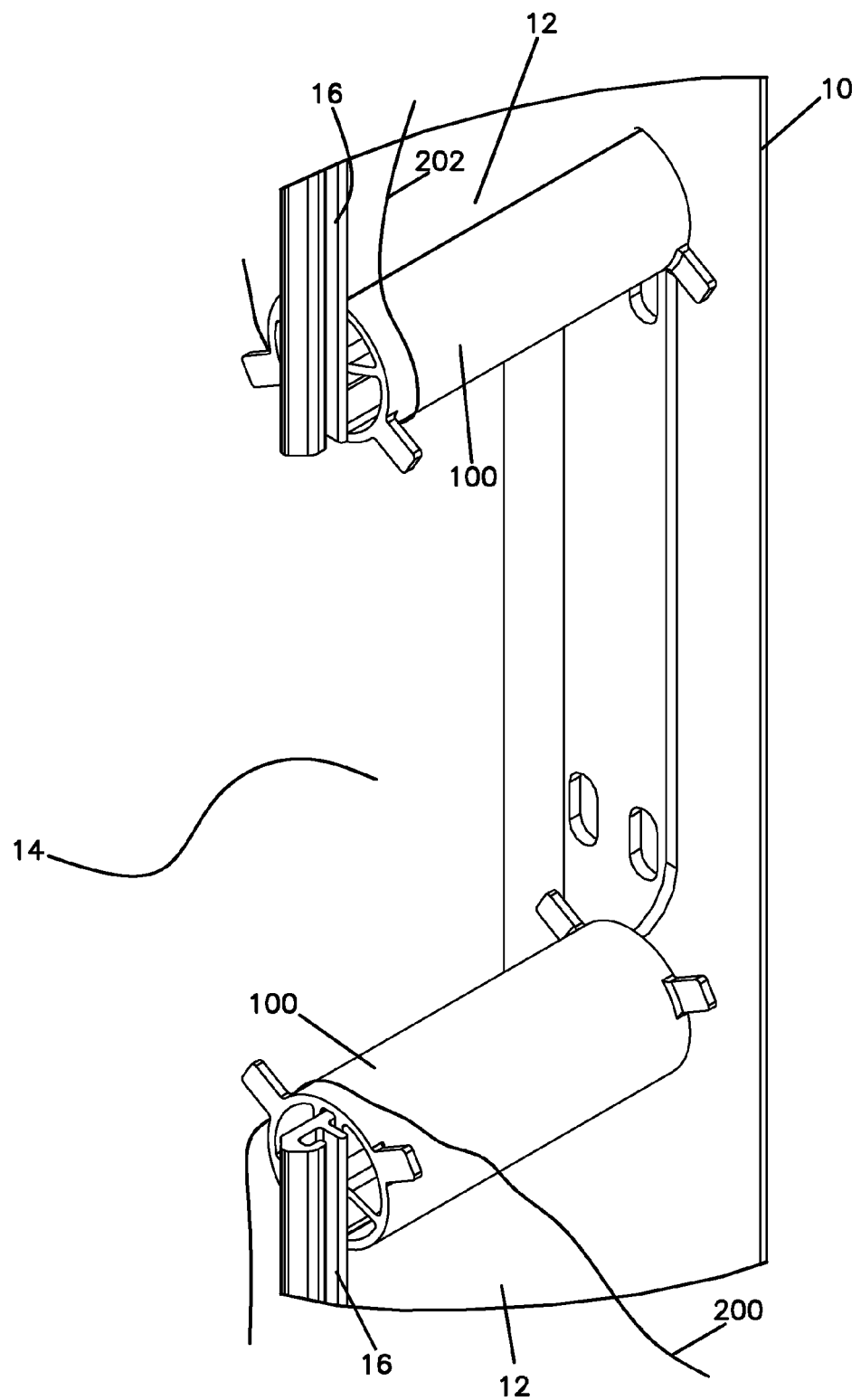
FIG. 10 is a perspective view of the two bend radius limiters shown in FIG. 9 after installation in a first and second orientation on a fiber guide.
Figure 11:
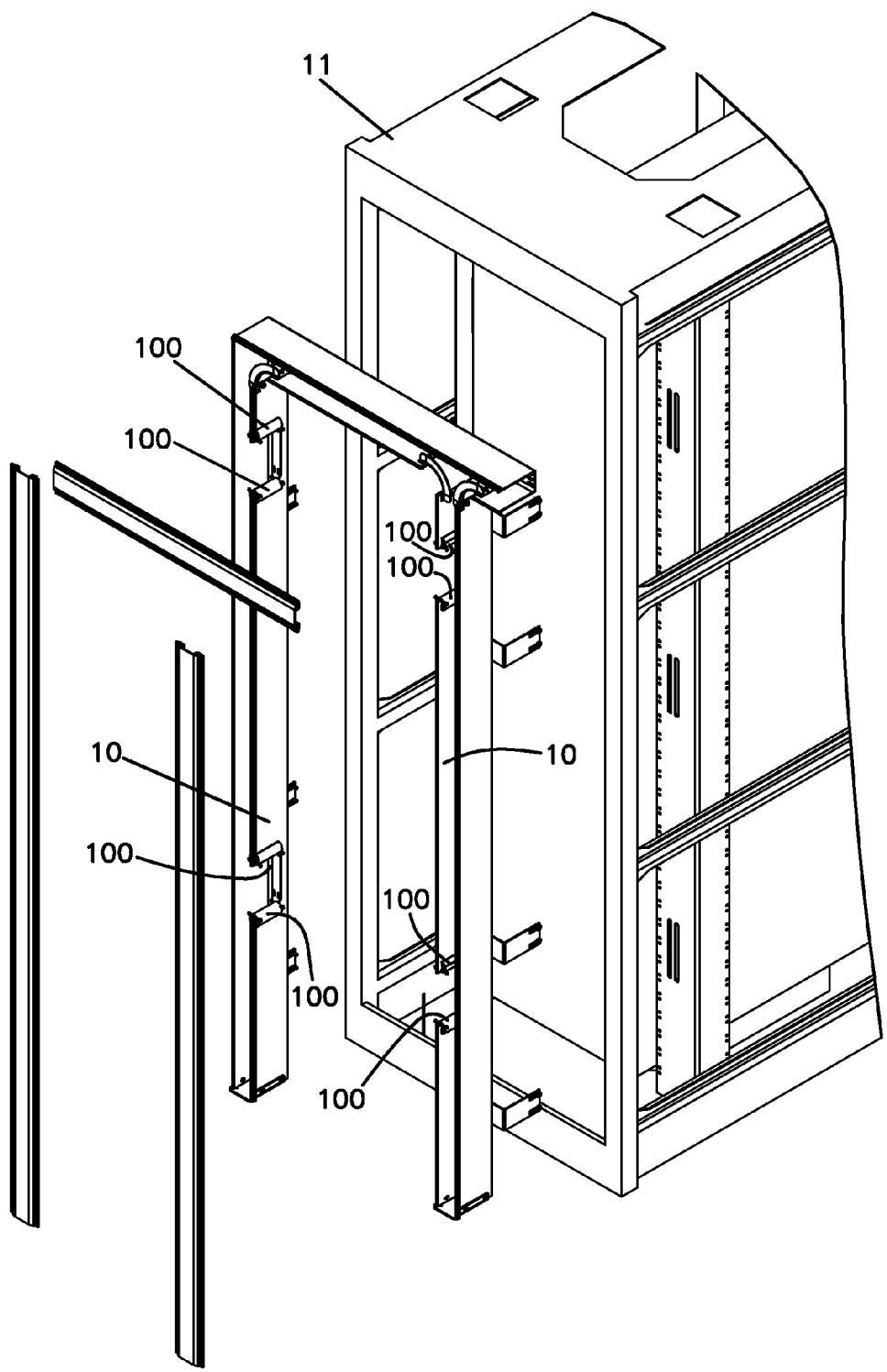
FIG. 11 is a perspective view of a fiber distribution rack having a plurality of the bend radius limiters shown in FIG. 1 installed.

It is noted that the bend radius limiter 100 can be installed in a first orientation in which the longitudinal slot 116 is downward facing or in an inverted second orientation in which the longitudinal slot 116 is upwardly facing. For example, FIG. 7 shows a bend radius limiter 100 during installation (e.g. not fully installed onto the fiber guide 10) in the second orientation while FIG. 8 shows a bend radius limiter 100 during installation in the first orientation. In both cases, the bend radius limiter 100 is placed in an opening 14 adjacent the extension member 12 and then depressed and further aligned (i.e. rotated) onto the extension member 12. FIG. 9 shows bend radius limiters 100 in both the first and second orientations in an uninstalled state while FIGS. 10 and 11 show the same configuration, but in a completely installed state.

The bend radius limiter 100 can be produced from a variety of materials. For example, the bend radius limiter 100 may be produced from a plastic material or a metal material. In one example, the bend radius limiter 100 is produced from an ABS plastic material. In one embodiment, the material for the bend radius limiter 100 is a plastic that meets the Underwriters Laboratory UL-94 flammability safety standard, for example, UL Standard UL-94 V-0. Additionally, each of the above described components of the bend radius limiter 100 may be included in a single molded part. However, other configurations and materials are possible.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the disclosure.

What is claimed is:

1. A bend radius limiter adapted for installation on a fiber guide, the bend radius limiter comprising:
   (a) a main body having a generally rounded outer surface and an interior surface defining an interior volume, the main body extending between a first end and a second end and having a first length;
   (b) a first slot opening in the generally rounded outer surface, the first slot opening extending along the first length; and
   (c) a first connecting feature configured to retain the bend radius limiter onto the fiber guide, the first connecting feature being located within the interior volume and being radially aligned with the first slot opening.

2. The bend radius limiter of claim 1, wherein the first connecting feature includes a pair of engagement members that extend radially inward from the interior surface and towards the first slot opening.

3. The bend radius limiter of claim 2, wherein each of the engagement members includes at least one inwardly extending protrusion.

4. The bend radius limiter of claim 3, wherein the engagement members have an unequal number of inwardly extending protrusions.

5. The bend radius limiter of claim 4, wherein the inwardly extending protrusions are ribs that provide for an indexing feature for enabling an installer to determine when the bend radius limiter has been fully installed on a fiber guide.

6. The bend radius limiter of claim 5, wherein the inwardly extending protrusions that are ribs are offset from each other.

7. The bend radius limiter of claim 1, wherein the first slot is configured as a second connecting feature configured to additionally retain the bend radius limiter onto the fiber guide.

8. The bend radius limiter of claim 1, wherein the main body is provided with at least one cable retention member at the first end and at least one cable retention member at the second end.

9. The bend radius limiter of claim 1, wherein the bend radius limiter is made from a plastic material.

10. The bend radius limiter of claim 1, wherein the generally rounded outer surface is a generally cylindrical outer surface.

11. The bend radius limiter of claim 10, wherein the generally cylindrical outer surface has a diameter of about 1 inch.

12. A fiber guide and bend radius limiter combination comprising:
   (a) a fiber guide having at least one extension member and an adjacent side opening;
   (b) a removable bend radius limiter including:
      i. a main body having a generally cylindrical outer surface and an interior surface defining an interior volume, the main body extending between a first end and a second end and having a first length;
      ii. a first slot opening in the generally cylindrical outer surface, the first slot opening extending along the first length, wherein one of the extension members passes through the first slot opening; and
      iii. a first connecting feature located within the interior volume and being radially aligned with the first slot opening, wherein the first connecting feature is engaged with the at least one extension member.

13. The fiber guide and bend radius limiter combination of claim 12, wherein the first connecting feature includes a pair of engagement members that extend radially inward from the interior surface and towards the first slot opening along a first and second side of the at least one fiber guide extension member.

14. The fiber guide and bend radius limiter combination of claim 13, wherein each of the engagement members includes at least one inwardly extending protrusion.

15. The fiber guide and bend radius limiter combination of claim 14, wherein the engagement members have an unequal number of inwardly extending protrusions.

16. The fiber guide and bend radius limiter combination of claim 15, wherein the inwardly extending protrusions are ribs that provide for an indexing feature for enabling an installer to determine when the bend radius limiter has been fully installed on the fiber guide at least one extension member.

17. The fiber guide and bend radius limiter combination of claim 16, wherein the inwardly extending protrusions that are ribs are offset from each other.

18. The fiber guide and bend radius limiter combination of claim 12, wherein the first slot is configured as a second connecting feature configured to additionally retain the bend radius limiter onto the fiber guide.

19. The fiber guide and bend radius limiter combination of claim 12, wherein the main body is provided with at least one cable retention member at the first end and at least one cable retention member at the second end.

20. The fiber guide and bend radius limiter combination of claim 12, wherein the bend radius limiter is made from a plastic material.

21. The fiber guide and bend radius limiter combination of claim 12, wherein the outer surface is generally cylindrical and has a diameter of about 1 inch.

* * * * *